UNITED STATES PATENT OFFICE.

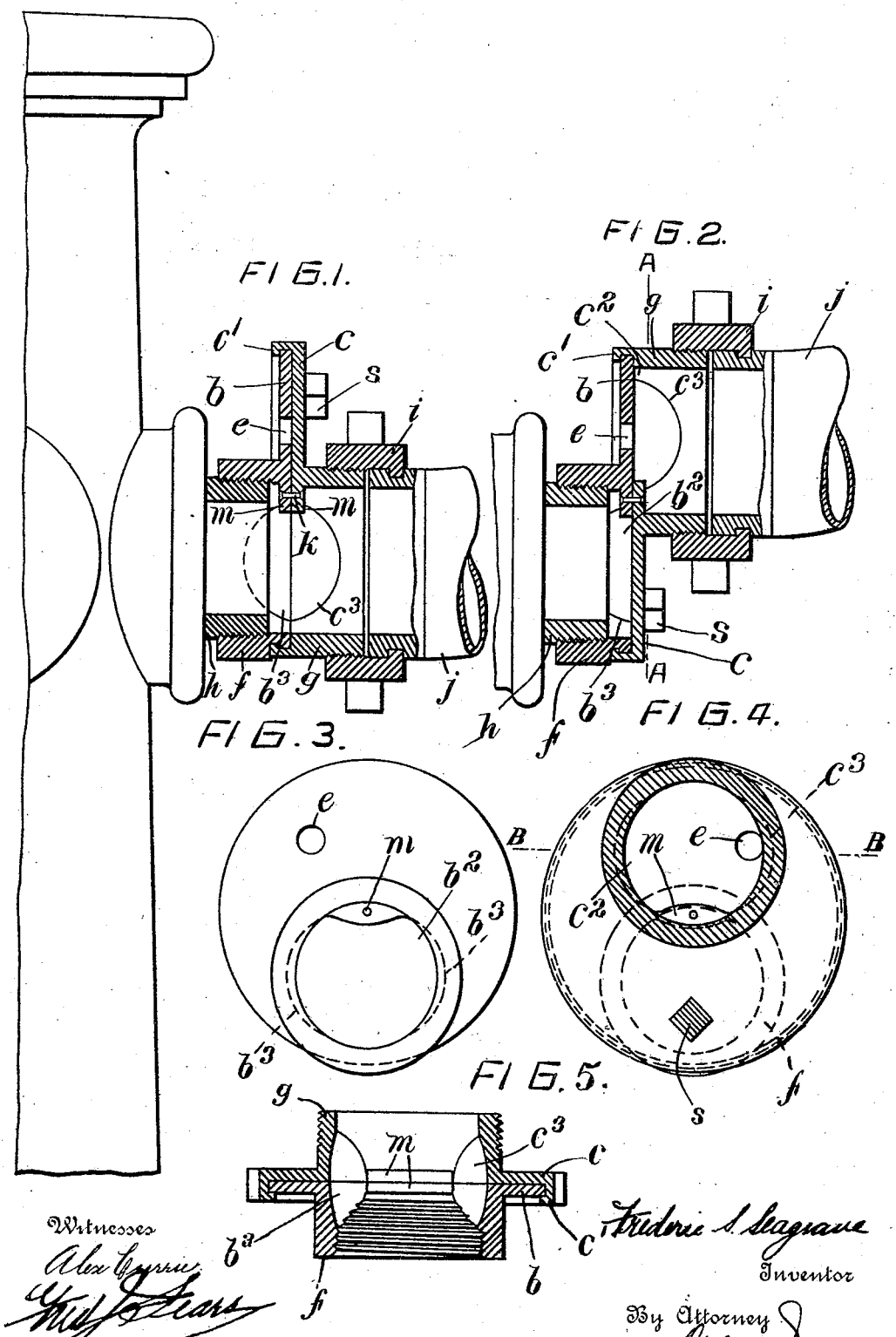

FREDERIC SCOTT SEAGRAVE, OF DETROIT, MICHIGAN.

HYDRANT CUT-OFF VALVE.

No. 880,580.  Specification of Letters Patent.  Patented March 3, 1908.

Application filed October 23, 1905. Serial No. 284,024.

*To all whom it may concern:*

Be it known that I, FREDERIC SCOTT SEAGRAVE, of the city of Detroit, State of Michigan, United States of America, have invented certain new and useful Improvements in Hydrant Cut-Off Valves; and I do hereby declare that the following is a full, clear, and exact description of the same.

My invention has for its object to provide a hydrant cut-off valve which will not freeze up, one which will, when desired, drain the hose after the water is cut off and while full pressure is still maintained in the hydrant, and one which can be fitted to the hydrant without reducing the discharge port of the latter or the stream flowing therethrough.

Another object of the invention is to provide a cut off device capable of being screwed upon the hydrant nipples in general use; and a further and important object is to provide a cut-off device adapted to be permanently carried by the hydrant and offer practically no obstruction to passing vehicles or pedestrians.

The invention consists of a device comprising a pair of members one movable relatively to and carried by the other, and one having formed integrally therewith internally threaded means whereby it can be coupled to the hydrant, and means being formed integrally with the other member whereby the latter can have the hose coupled thereto. Such members have valvular openings adapted to register with each other when the members are in one relative position, and the valvular openings communicating respectively with the means for coupling the device to the hydrant and the means for coupling the hose to the said device.

A further feature of the invention consists of means whereby the hose can be drained while full pressure is still maintained in the hydrant, and therefore without disturbing other streams leading therefrom.

For full comprehension, however, of my invention reference must be had to the accompanying drawings forming a part of this specification in which similar reference characters indicate the same parts and wherein Figure 1 is a longitudinal vertical sectional view of a cut-off valve constructed according to my invention and attached to a hydrant which is illustrated in side elevation, the members of my improved cut-off being in position to allow the water to flow; Fig. 2 is a similar view with the members in position cutting off the stream, and with the relief valve operating; Fig. 3 is a detail face view of the disk adjacent to the hydrant; Fig. 4 is a transverse vertical sectional view taken on line A A Fig. 2 and illustrating particularly the outer disk in face view, and Fig. 5 is a horizontal sectional view taken on line B, B, Fig. 4.

A pair of disks $b$ and $c$ are retained in close contact with one another preferably by a flange $c'$ formed upon the periphery of the disk $c$ and overlapping the edge of the disk $b$ sufficiently loose, however, to allow the disk $c$ to be rotated upon the disk $b$. These disks have ports $b^2$ and $c^2$, respectively, eccentrically therein and the disk $b$ has a small port $e$. A pair of coupling sleeves or collars $f$ and $g$, respectively, one ($f$) being internally screw-threaded and adapted to be screwed upon the usual nipple $h$ projecting from the hydrant, and the other ($g$) being externally screw threaded to have the usual turnbuckle $i$ carried by the hose length $j$ screwed thereon.

The disks are pivotally connected together preferably by a rivet $k$ projecting through eyes $m$ centrally of such disks. This pivot point must be centrally of the disks and as I prefer to use disks of as small diameter as possible, consequently the pivot point is located within and near the edge of the main ports $b^2$ and $c^2$ hence the necessity of the eyes $m$. When larger disks are used the centers thereof will be located outside of the ports and in the substance of the disks. In order to prevent the flow of water through these ports being retarded by the eyes, or the stream to be reduced the sides of the ports are cut away as at $b^3 c^3$.

The relative areas of the ports ($b^2$ or $e^2$) and the disks are such that the disk $c$ can be moved to either bring the port $c^2$ in position to register with port $b^2$ or the portion of disk $b$ between the port $b^2$ and the small port $e$, or in position to register with such small port $e$.

By moving the disk $c$ to a position to cause the port $c^2$ to register with the port $b^2$ the water is turned on, and a reverse movement cuts off the stream. The port $e$ constitutes a relief valve. The main object of the relief valve $e$ is to enable the hose length to be emptied when desired, after the water has been cut off by the manipulation of my improved device and while the full pressure is still maintained in the hydrant.

The disk c is provided with a projection s to afford a hold for the usual fireman's spanner, and enable the said disk to be rotated.

The main advantages of my improved hydrant cut-off valve is that there is no place therein for water to lodge and freeze whatever position the disks may be in, it can be quickly operated, it is simple and inexpensive to construct, and it requires no other tools to operate it than the usual hose key or spanner in use by all firemen. Another advantage is that the hose can be fully coupled or screwed on to my improved cut-off device without turning on the stream, and furthermore, the stream can be instantaneously cut off without touching or unscrewing the hose.

Although I have illustrated the valvular members of my improved cut-off device as of complete circular form, they may be arciform, if of large enough radius, without departing from the spirit of my invention.

The plates are assembled by forming the plate c with its flange c' flared sufficiently to receive the plate b, and after the plate b is in place the said flange is pressed over the edge thereof as shown in Figs. 1, 2 and 5, thus retaining plate c against axial displacement.

What I claim is as follows:—

1. The combination with a hydrant, of a cut-off valve comprising a pair of circular members adapted to lie in close contact with each other and one rotate upon the other, means retaining such members against other displacement than rotary, the said members having eccentric ports therein, means whereby the said members are coupled to a pair of fluid conductors, and means whereby a hose key is rotatively connected to the rotatable member.

2. A hydrant cut-off valve comprising a pair of circular disks adapted to lie in close contact with each other and one rotate upon the other, one of such disks having an integral part engaging the other disk and retaining the same against other displacement than rotary, the said disks each having an eccentric port therein, and one of the said disks having a second port therein, such second port being located a distance from the first port greater than the diameter of the port in the other disk, an internally screw-threaded coupling sleeve formed integrally with one of such disks and an internally screw threaded coupling sleeve formed integrally with the other disk, and one of the said disks having means for the connection of a hose key whereby it can be rotated.

3. A hydrant cut-off valve comprising a pair of circular disks adapted to lie in close contact with each other and one rotate upon the other, one of such disks having its periphery flanged and engaging the other disk and retaining the same against other displacement than rotary, the said disks each having an eccentric port therein, and one of the said disks having a second port therein, such second port being located a distance from the first port greater than the diameter of the port in the other disk, an internally screw-threaded coupling sleeve formed integrally with one of such disks and an externally screw threaded coupling sleeve formed integrally with the other disk, and one of the said disks having means for the connection of a hose key whereby it can be rotated.

4. A hydrant cut-off valve adapted to be coupled to a hydrant and have a hose coupled thereto, such cut-off valve comprising a pair of members one movable relatively to the other in three degrees of movement, one position of the members relatively to one another, effecting a communication between the hydrant and hose, a second position closing the outlet from both hydrant and hose through the valve, and a third position closing the outlet of the hydrant and effecting an outlet from the hose, substantially as described and for the purpose set forth.

In testimony whereof, I have signed my name to this specification, in the presence of two subscribing witnesses.

FREDERIC SCOTT SEAGRAVE.

Witnesses:
　WILLIAM P. McFEAT,
　FRED. J. SEARS.